United States Patent
Larsson et al.

(10) Patent No.: US 8,867,464 B2
(45) Date of Patent: Oct. 21, 2014

(54) METHODS AND ARRANGEMENTS IN A WIRELESS COMMUNICATION SYSTEM

(75) Inventors: Daniel Larsson, Solna (SE); Robert Baldemair, Solna (SE); Dirk Gerstenberger, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 125 days.

(21) Appl. No.: 13/378,905

(22) PCT Filed: Jun. 21, 2011

(86) PCT No.: PCT/SE2011/050817
§ 371 (c)(1),
(2), (4) Date: Dec. 16, 2011

(87) PCT Pub. No.: WO2012/002881
PCT Pub. Date: Jan. 5, 2012

(65) Prior Publication Data
US 2012/0275395 A1    Nov. 1, 2012

Related U.S. Application Data

(60) Provisional application No. 61/359,104, filed on Jun. 28, 2010.

(51) Int. Cl.
*H04W 4/00* (2009.01)
*H04L 5/00* (2006.01)
*H04W 52/54* (2009.01)
*H04W 52/34* (2009.01)
*H04L 1/18* (2006.01)
*H04W 28/06* (2009.01)
*H04W 72/04* (2009.01)

(52) U.S. Cl.
CPC .............. *H04W 28/06* (2013.01); *H04L 5/001* (2013.01); *H04L 5/0094* (2013.01); *H04W 52/545* (2013.01); *H04W 52/34* (2013.01); *H04L 1/1854* (2013.01); *H04L 5/0053* (2013.01); *H04L 5/0007* (2013.01); *H04L 1/1861* (2013.01); *H04W 72/042* (2013.01)
USPC ........... 370/329; 370/328; 370/352; 370/356; 370/355

(58) Field of Classification Search
USPC .................................. 370/352, 356, 329, 328
See application file for complete search history.

(56) References Cited

U.S. PATENT DOCUMENTS

2012/0057547 A1\* 3/2012 Lohr et al. ..................... 370/329
2012/0069815 A1\* 3/2012 Aiba et al. ..................... 370/329

(Continued)

OTHER PUBLICATIONS

Huawei. UL ACK/NACK Feedback Related DCI Design for Carrier Aggregation, 3GPP Draft; R1-101943, 3$^{rd}$ Generation Partnership Project (3GPP). Apr. 6, 2010.
Pantech. On the Cross-Carrier CFI Signaling by PDCCH. 3GPP Draft; R1-102834, 3$^{rd}$ Generation Partnership Project (3GPP). May 4, 2010.

(Continued)

*Primary Examiner* — Asad Nawaz
*Assistant Examiner* — Khaled Kassim

(57) ABSTRACT

A method for processing downlink control information in a mobile terminal capable of receiving multiple component carriers. The mobile terminal receives on a component carrier, downlink control information that includes a bit field allocated for a transmit power control (TPC) command. If the bit field comprises one or more bits that are not used for the TPC command, the mobile terminal interprets the meaning of the bits not used for the TPC command based on an ACK/NACK feedback mode with which the mobile terminal is configured.

8 Claims, 11 Drawing Sheets

(56) References Cited

U.S. PATENT DOCUMENTS

| | | | |
|---|---|---|---|
| 2012/0076037 A1* | 3/2012 | Noh et al. | 370/252 |
| 2012/0134305 A1* | 5/2012 | Damnjanovic et al. | 370/280 |
| 2012/0155337 A1* | 6/2012 | Park | 370/280 |
| 2012/0207107 A1* | 8/2012 | Li et al. | 370/329 |
| 2012/0236767 A1* | 9/2012 | Zhu et al. | 370/280 |
| 2012/0327878 A1* | 12/2012 | Pedersen et al. | 370/329 |
| 2013/0022000 A1* | 1/2013 | Garcia et al. | 370/329 |
| 2013/0201946 A1* | 8/2013 | Lunttila et al. | 370/329 |

OTHER PUBLICATIONS

Potevio. Discussion About TPC Transmission for CA in LTE-A. 3GPP Draft; R1-102231, $3^{rd}$ Generation Partnership Project (3GPP). Apr. 6, 2010.

3GPP, LTE; Evolved Universal Terrestrial Radio Access (E-UTRA); Physical Layer Procedures (3GPP TS 36.213 version 9.1.0 Release 9). Apr. 1, 2010.

Huawei. UL ACK/NACK Resource Allocation for Carrier Aggregation 3GPP Draft; R1-01051, $3^{rd}$ Generation Partnership Project (3GPP). Feb. 16, 2010.

* cited by examiner

EXAMPLE eNB BLOCK DIAGRAM

METHODS AND ARRANGEMENTS IN A WIRELESS COMMUNICATION SYSTEM

This application claims the benefit of U.S. Provisional Application No. 61/359,104, filed Jun. 28, 2010, the disclosure of which is fully incorporated herein by reference.

TECHNICAL FIELD

The invention relates generally to carrier aggregation in a wireless communication system, and more particularly to methods and arrangements for processing and transmitting downlink control information.

BACKGROUND

The 3rd Generation Partnership Project (3GPP) is responsible for the standardization of the Universal Mobile Telecommunication System (UMTS) and its Long Term Evolution (LTE). The 3GPP work on LTE is also referred to as Evolved Universal Terrestrial Access Network (E-UTRAN). LTE is a radio access technology for realizing high-speed packet-based communication that can reach high data rates both in the downlink and in the uplink, and is thought of as a next generation mobile communication system relative to UMTS.

LTE uses OFDM (Orthogonal Frequency Division Multiplexing) in the downlink and Discrete Fourier Transform-spread (DFT-spread) OFDM in the uplink. The basic LTE downlink physical resource can thus be seen as a time-frequency grid as illustrated in FIG. 1, where each resource element, i.e. each square in the grid, corresponds to one OFDM subcarrier during one OFDM symbol interval.

In the time domain, LTE downlink transmissions are organized into radio frames of 10 ms, each radio frame consisting of ten equally-sized subframes of length $T_{subframe}$=1 ms. The LTE time-domain structure is illustrated in FIG. 2. Furthermore, resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth.

Downlink transmissions are dynamically scheduled, i.e., in each subframe the base station transmits control information indicating to which terminals data is being transmitted, and upon which resource blocks the data is transmitted, in the current downlink subframe. This control signaling is typically transmitted in a control region comprising the first 1, 2, 3 or 4 OFDM symbols in each subframe. A downlink subframe with 3 OFDM symbols as control region is illustrated in FIG. 3.

Hybrid-ARQ (Automatic Repeat Request), also known as HARQ, is a method used in LTE for correcting transmission errors where data units that are not acknowledged by the receiver are automatically retransmitted. Forward error correction bits are also added to the data to enable the receiver to correct and/or detect if a packet has been incorrectly received. Thus, after receiving downlink data in a subframe, the terminal attempts to decode it and reports to the base station whether the decoding was successful (acknowledgement, ACK) or not (negative acknowledgement, NAK). In case of an unsuccessful decoding attempt, the base station may retransmit the erroneous data.

Uplink control signaling from the terminal to the base station comprises
- hybrid-ARQ acknowledgements for received downlink data;
- terminal reports related to the downlink channel conditions, used as assistance for the downlink scheduling;
- scheduling requests, indicating that a mobile terminal needs uplink resources for uplink data transmissions.

If the mobile terminal has not been assigned an uplink resource for data transmission, the L1/L2 control information, e.g. channel-status reports, hybrid-ARQ acknowledgments, and scheduling requests, is transmitted in uplink resources, i.e. resource blocks, specifically assigned for uplink L1/L2 control on the Physical Uplink Control CHannel (PUCCH). As illustrated in FIG. 4, these resources are located at the edges of the total available cell bandwidth. Each such resource consists of 12 subcarriers, i.e. one resource block in frequency, within each of the two slots of an uplink subframe. In order to provide frequency diversity, these frequency resources are frequency hopping on the slot boundary, i.e. one resource consists of 12 subcarriers at the upper part of the spectrum within the first slot of a subframe and an equally sized resource at the lower part of the spectrum during the second slot of the subframe or vice versa. If more resources are needed for the uplink L1/L2 control signaling, e.g. in case of very large overall transmission bandwidth supporting a large number of users, additional resources blocks can be assigned next to the previously assigned resource blocks.

The reasons for locating the PUCCH resources at the edges of the overall available spectrum are two-fold:
- Together with the frequency hopping described above, this maximizes the frequency diversity experienced by the control signaling.
- Assigning uplink resources for the PUCCH at other positions within the spectrum, i.e. not at the edges, would have fragmented the uplink spectrum, making it difficult to assign very wide transmission bandwidths to single mobile terminal and still retain the single-carrier property of the uplink transmission.

The bandwidth of one resource block during one subframe is too large for the control signaling needs of a single terminal. Therefore, to efficiently exploit the resources set aside for control signaling, multiple terminals can share the same resource block. This is done by assigning the different terminals different orthogonal phase rotations of a cell-specific length-12 frequency-domain sequence and/or different orthogonal time-domain covers covering the subframes within a slot or subframe.

The LTE Rel-8 standard has recently been standardized, supporting bandwidths up to 20 MHz. However, in order to meet the upcoming IMT-Advanced requirements, 3GPP has initiated work on Release 10, also referred to as LTE-Advanced. One of the aims of LTE-Advanced is to support bandwidths larger than 20 MHz. One important requirement on LTE-Advanced is to assure backward compatibility with LTE Rel-8. This should also include spectrum compatibility. That would imply that an LTE-Advanced carrier, wider than 20 MHz, should appear as a number of LTE carriers to an LTE Rel-8 terminal. Each such carrier may be referred to as a component carrier (CC). In particular for early LTE-Advanced deployments it can be expected that there will be a smaller number of LTE-Advanced-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE-Advanced carrier. The straightforward way to obtain this would be by means of carrier aggregation. Carrier aggregation implies that an LTE-Advanced terminal can receive multiple CCs, where the CCs have, or at least the possibility to have, the same structure as a Rel-8 carrier. Carrier aggregation is illustrated in FIG. 5.

The number of aggregated CCs as well as the bandwidth of the individual CC may be different for uplink and downlink. A symmetric configuration refers to the case where the number of CC in downlink and uplink is the same, whereas an asymmetric configuration refers to the case that the number of CC is different. It is important to note that the number of CC configured in a cell may be different from the number of CC seen by a terminal: A terminal may for example support more downlink CC than uplink CC, even though the cell is configured with the same number of uplink and downlink CC.

In current LTE carrier aggregation terminology, the concepts of "primary serving cell" and "secondary serving cell" (SCell) are also used. A primary serving cell, or PCell, is configured on a primary component carrier, PCC, and a secondary serving cell, or SCell, is configured on a secondary component carrier, SCC. In this context, "component carrier" or "carrier" refers to the physical frequency resource that the cell is configured to use. Thus, whenever this disclosure refers to "a mobile terminal receiving information on a component carrier", "a base station transmitting on a component carrier" etc, it should be understood this does not preclude a situation where the mobile terminal or base station in question is configured with a primary serving cell and optionally one or more secondary serving cells, and where each serving cell in turn is configured on a component carrier.

Scheduling of the CC is done on the Physical Downlink Control Channel (PDCCH) via downlink assignments. Control information on the PDCCH is formatted as a Downlink Control Information (DCI) message. DCI messages for downlink assignments contain i.a. resource block assignment, modulation and coding scheme related parameters, hybrid-ARQ redundancy version, etc. In addition to those parameters that relate to the actual downlink transmission, most DCI formats for downlink assignments also contain a bit field for Transmit Power Control (TPC) commands. These TPC commands are used to control the uplink power on the corresponding PUCCH that is used to transmit the hybrid-ARQ feedback.

From a UE perspective, both symmetric and asymmetric uplink/downlink CC configurations are supported. For some of the configurations, one may consider the possibility to transmit the uplink control information on multiple PUCCH, PUSCH or multiple uplink CCs. However, this option is likely to result in higher UE power consumption and a dependency on specific UE capabilities. It may also create implementation issues due to inter-modulation products, and would lead to generally higher complexity for implementation and testing. Hence, it is advantageous if the transmission of PUCCH does not depend on the uplink/downlink CC configuration. Therefore it has been agreed for LTE Release 10 to use the design principle that all uplink control information for a UE should be semi-statically mapped onto one specific uplink CC, a so-called "anchor carrier", or uplink primary component carrier, PCC.

In case the ACK/NACK feedback would be transmitted on PUSCH, it would be beneficial if the ACK/NACK feedback was only transmitted on one CC, for similar reasons as described for PUCCH above.

For the base station to fully utilize all the DL HARQ processes in the UE, it is beneficial to have the individual HARQ bits fed back per HARQ process. In case of carrier aggregation and FDD this means that there will be a maximum of two HARQ processes that need to be fed back per component carrier. In case of TDD, there is also a time component associated with HARQ feedback, so there may be more than two HARQ processes that need to be fed back per CC.

One limiting factor for the downlink transmission is the possibility for the terminal to feedback all the HARQ states to all HARQ process reliably to the base station. In such a situation it is beneficial for the terminal to bundle together the HARQ states for several different HARQ process to generate common HARQ states, i.e. ACK/NACK bundling. This could be done across CCs, across layers (spatial bundling) or over time (temporal bundling). The ACK/NACK bundling may also be done according to any of these examples combined in different ways.

A basic problem with ACK/NACK bundling is that a terminal may miss a DL assignment, which may not be indicated in the bundled response. For instance, assume that the terminal was scheduled on two CCs. On CC 1 the terminal misses the scheduling assignment and will not be aware that it was scheduled, while in the second CC it successfully receives the data. The terminal will, as a result, transmit an ACK, which the base station will assume holds for both CCs, including data in the CC the terminal was not aware of. As a result, data will be lost. The lost data needs to be handled by higher-layer protocols, which typically takes a longer time than hybrid-ARQ retransmissions and is less efficient.

For this reason, it is beneficial to add a DL assignment index (DAI) in the DL assignment, which represents the number of assigned DL CCs. The terminal may, when it has received multiple DL assignments, count the number and compare it with the signalled number in the DAI to see whether it has missed any DL assignments. The terminal may, in the case that it is aware it has missed a DL assignment, provide an indication to the base station, for example by transmitting NACK or using a specific resource.

There is a general need in the art to reduce signaling overhead when transmitting control information.

SUMMARY

It is an object of particular embodiments of the invention to reduce signaling overhead when transmitting control information. A further object of particular embodiments is to enable flexible transmission of control information in dependence of the configured ACK/NACK feedback mode, without increasing the amount of signaling.

In particular embodiments of the invention, a method is provided in a mobile terminal for processing downlink control information. The mobile terminal is capable of receiving multiple component carriers. According to the method, the mobile terminal receives downlink control information on a component carrier. The downlink control information comprises a bit field allocated for a transmit power control, TPC, command. If the bit field comprises one or more bits that are not used for a TPC command, the mobile terminal interprets the meaning of the bits not used for a TPC command depending on the ACK/NACK feedback mode the mobile terminal is configured with.

In particular embodiments, if the mobile terminal is configured in an ACK/NACK bundling feedback mode, the mobile terminal interprets the bits not used for a TPC command as comprising bundling information, e.g. an indication of a number of downlink assignments the mobile terminal should have received, or will receive.

In other embodiments, a method is provided in a base station for transmitting downlink control information to a mobile terminal on a component carrier. The downlink control information comprises a bit field allocated for a transmit power control, TPC, command. The base station is capable of transmitting on multiple component carriers. According to the method, if the bit field comprises one or more bits that will not be used for transmitting a TPC command to the mobile terminal, the base station uses at least one of the bits to transmit information other than TPC commands. The type of information transmitted depends on the ACK/NACK feedback mode the mobile terminal is configured with.

In particular embodiments, if the mobile terminal is configured in an ACK/NACK bundling feedback mode, the base station transmits bundling information in the bits that will not be used for transmitting a TPC command. For instance, an indication of a number of downlink assignments the mobile terminal should have received, or will receive, may be transmitted in the bits.

In yet further embodiments, a mobile terminal is provided for processing downlink control information. The mobile terminal is configured to receive multiple component carriers. The mobile terminal comprises one or more transceiver circuits, and one or more communication and control circuits. The communication and control circuits are configured to receive downlink control information on a component carrier. The downlink control information comprises a bit field allocated for a transmit power control, TPC, command. Furthermore, the communication and control circuits are configured to, if the bit field comprises one or more bits that are not used for a TPC command, interpret the meaning of at least one of the bits not used for a TPC command depending on the ACK/NACK feedback mode the mobile terminal is configured with.

In other embodiments, a base station is provided for transmitting downlink control information to a mobile terminal on a component carrier. The downlink control information comprises a bit field allocated for a transmit power control, TPC, command. The base station is configured to transmit on multiple component carriers. The base station comprises one or more transceiver circuits, and one or more communication and*control circuits. The communication and control circuits are configured to, if the bit field comprises one or more bits that will not be used for transmitting a TPC command to the mobile terminal, use at least one of the bits to transmit information other than TPC commands. The type of information transmitted depends on the ACK/NACK feedback mode the mobile terminal is configured with.

According to particular embodiments, bits that are not used for transmitting TPC commands may be reused for transmitting other information, such as bundling information, thereby reducing signaling overhead. As the unused TPC bits may, in particular embodiments, be used for different purposes depending on the configured ACK/NACK feedback mode, there will be greater scheduling flexibility compared to if the bits are always used for the same purpose.

DETAILED DESCRIPTION

Figure 1:
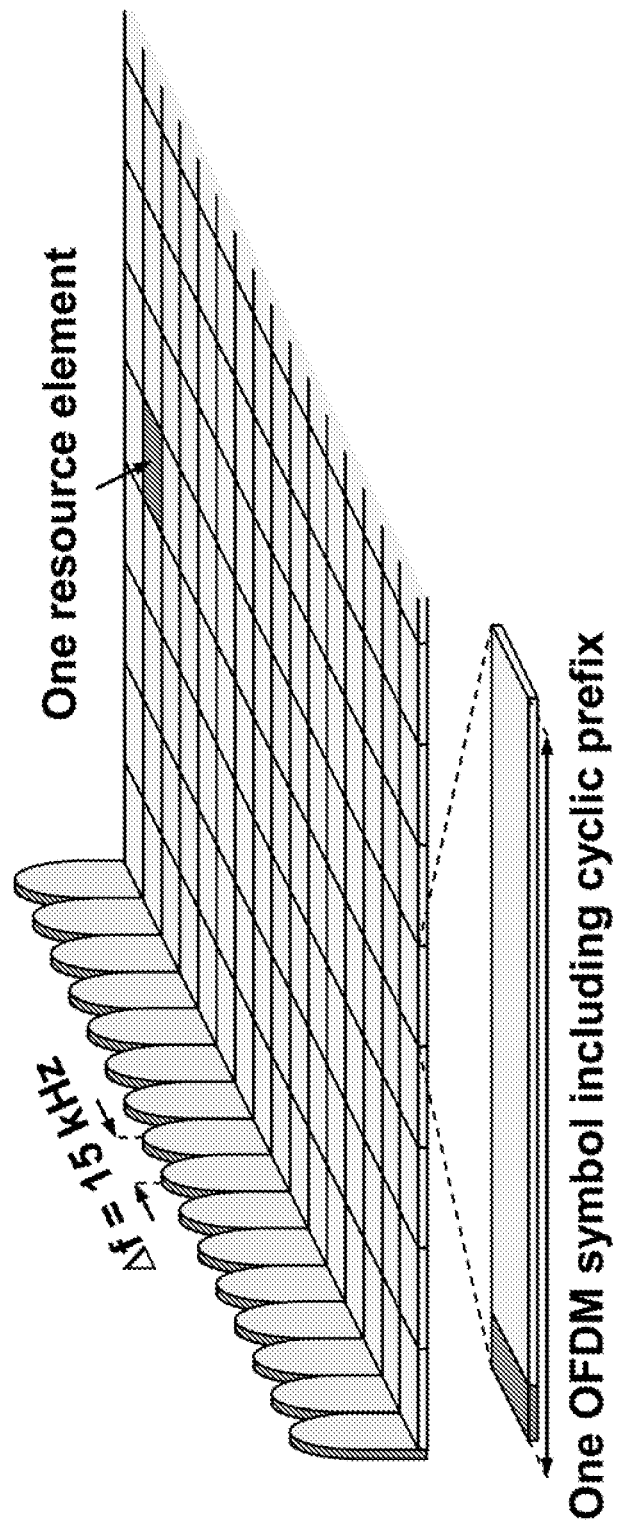
FIG. 1 is a schematic diagram illustrating the LTE downlink physical resource.
Figure 2:
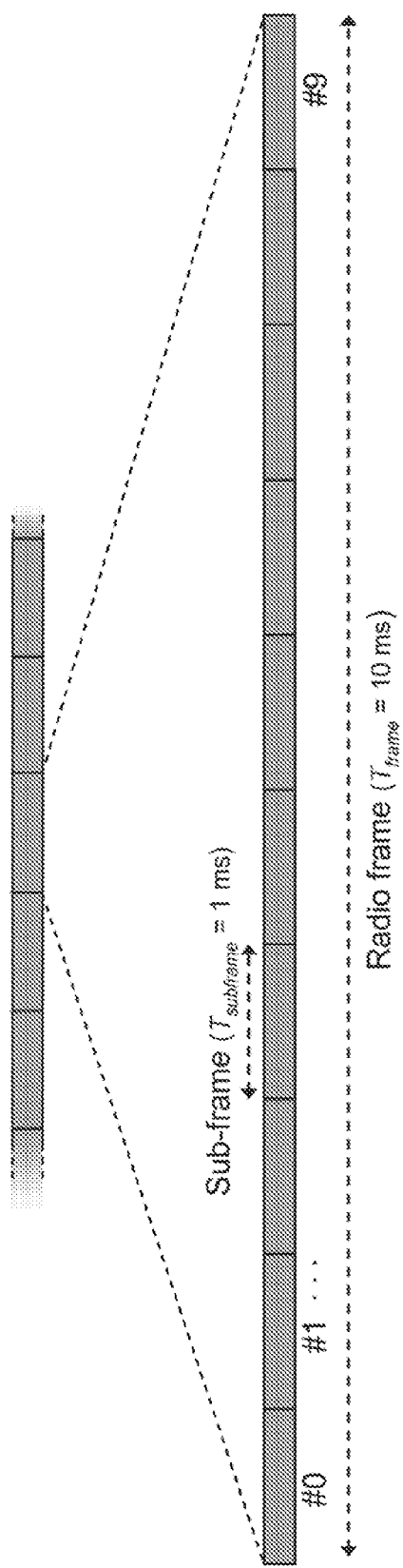
FIG. 2 is a schematic diagram illustrating the LTE time-domain frame structure.
Figure 3:
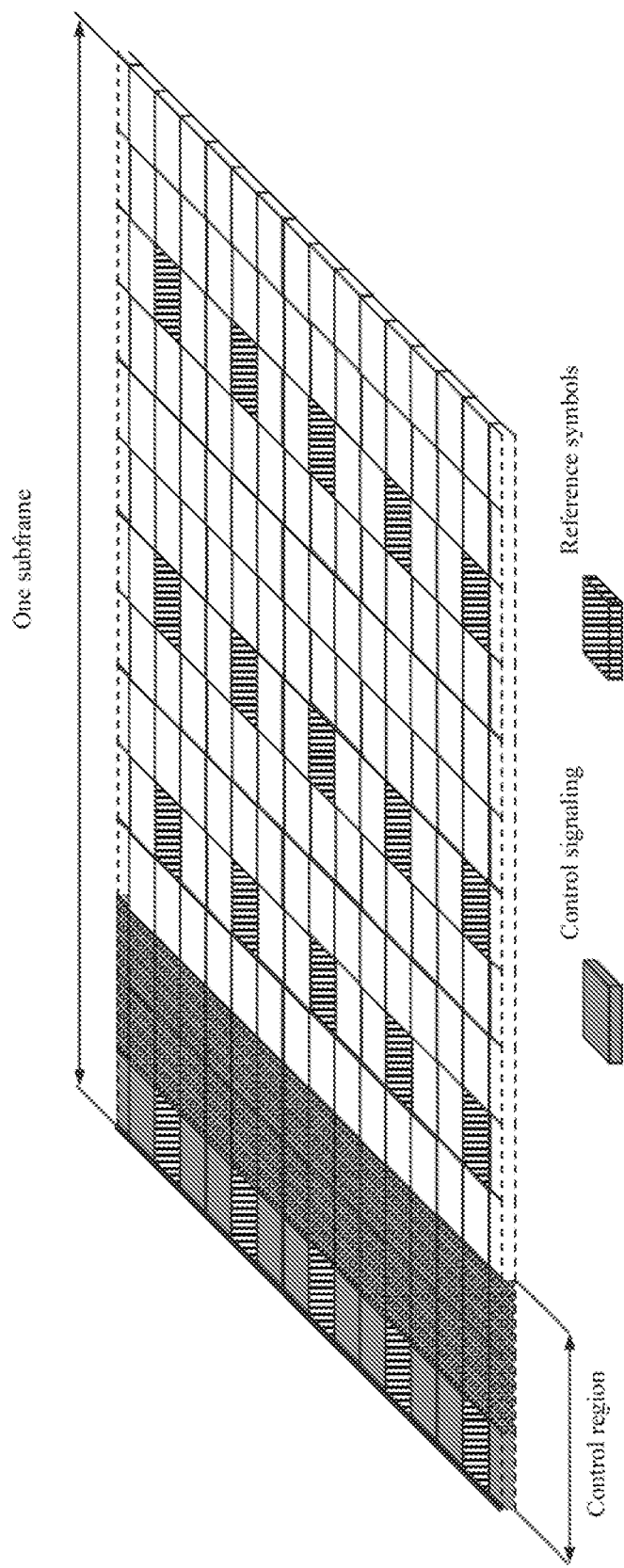
FIG. 3 is a diagram illustrating a downlink subframe.
Figure 4:
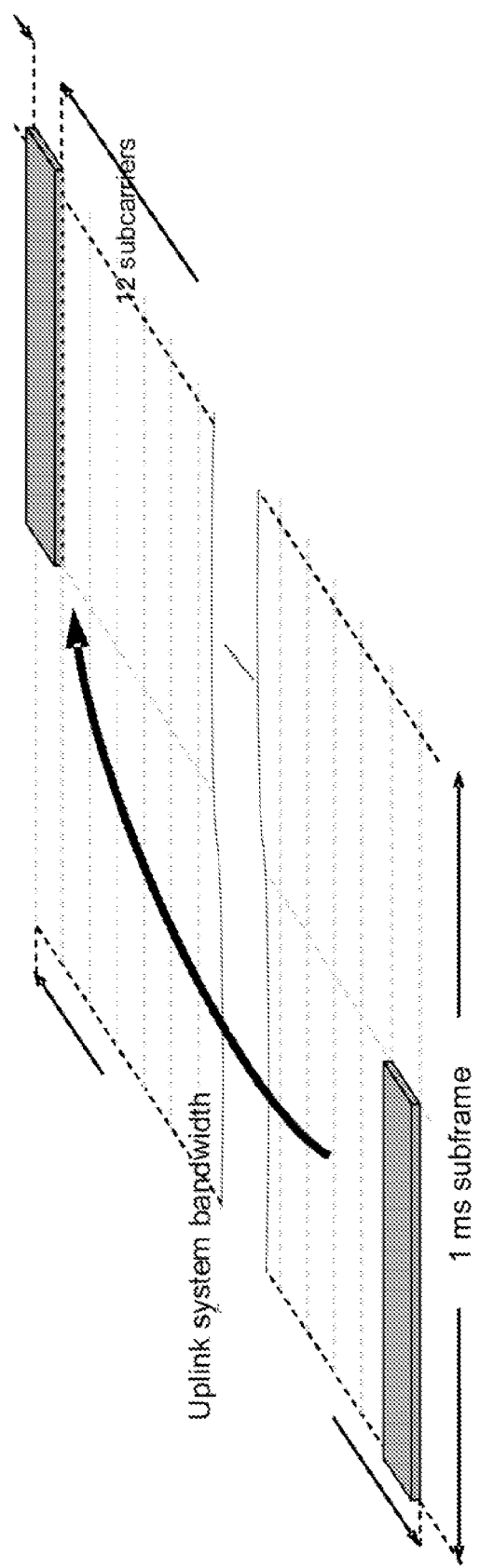
FIG. 4 is a diagram illustrating uplink control signaling transmission on PUCCH.
Figure 5:
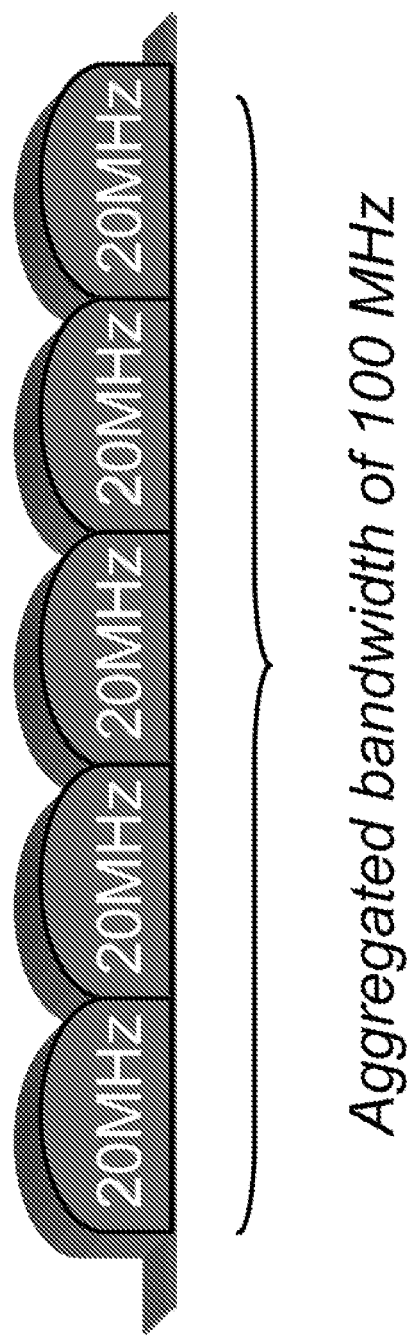
FIG. 5 is a diagram illustrating carrier aggregation.
Figure 6:
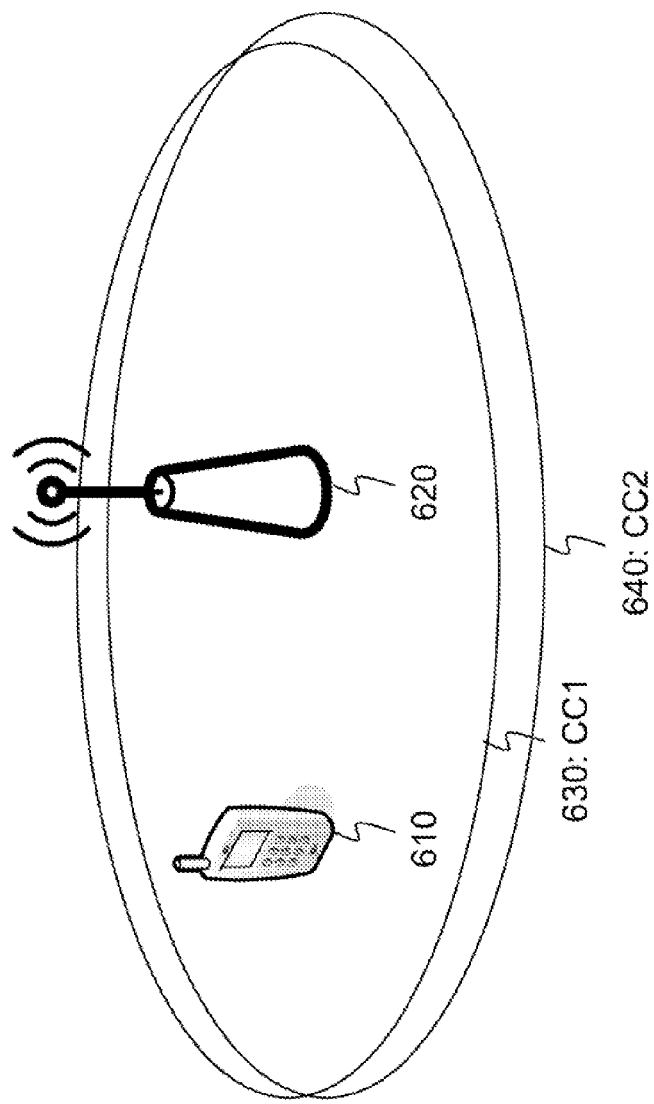
FIG. 6 is a schematic diagram illustrating a wireless communication network.

FIG. 6 illustrates an example scenario in which particular embodiments of the invention may operate. A mobile terminal 610 is served by a base station 620. In this example, the base station 620 is configured to transmit on two component carriers 630 and 640. The mobile terminal 610 is a carrier aggregation-capable terminal, i.e. capable of receiving multiple component carriers, and has been configured by base station 620 to use component carriers 630 and 640.

In case a terminal, e.g. terminal 610, is scheduled on multiple downlink CCs, each DCI message that contains a downlink assignment also contains a TPC command for the corresponding PUCCH transmissions. However, as mentioned earlier, in some embodiments all uplink control information is transmitted on a single uplink CC, and therefore all the TPC commands will in fact refer to the same uplink CC. Therefore, in the best case transmitting TPC on multiple downlink CCs results in unnecessary overhead. In the worst case the TPC commands are different, leading to unpredictable UE behavior.

One possible solution would be to remove the TPC bits in all but one DCI message. However, this would increase the number of blind decodings the terminal has to perform, since a terminal is supposed to decode DCI messages with certain sizes. Removing the TPC bits in some DCI messages changes their size thus adds blind decodings.

A terminal, e.g. terminal 610, may determine by configuration or based on a rule whether to receive the true TPC command by the whole or parts of the TPC bits on downlink assignments for a specific CC. This can be done e.g. for each CC individually or for a group of CCs. This can either be configured, or preferably some implicit rule is used, e.g. the CC with the lowest CC index contains true TPC command(s). Another rule would be to base the CC on the downlink system bandwidth, e.g. the CC with the lowest system bandwidth contains the true TPC command. If multiple downlink CCs have the same bandwidth, a combination of multiple implicit rules can be used. Another rule could be that the assignments for the PCC (primary component carrier), PCell (primary serving cell), or serving cell carry true TPC bits.

A valuable insight is that the bits that do not carry the actual TPC command may instead be used to convey other information, either individually or together, as follows:

In particular embodiments of system 600, in the CC that carries true TPC commands, the TPC bits that are not used for TPC commands may be used to convey information other than TPC commands. In other words, if the TPC bit field is larger than required for transmitting the TPC commands, the additional bits may be reused for other information.

The bits in the TPC field in the other CC(s) may be used, e.g. by base station 620, to convey information other than TPC commands.

The information conveyed in these other TPC field bits, i.e. in the bits not used for transmitting TPC commands, may be varied depending on the ACK/NACK feedback method the terminal is configured with. For example, assume that the terminal is configured in an ACK/NACK feedback mode where the different ACK/NACK are bundled together to a fewer number of ACK/NACK bits. For this case, the bits of the TPC bit field can be used to indicate how many downlink assignments the terminal should have received or will receive, i.e. as a downlink assignment index, DAI. In case of full HARQ feedback it may be more beneficial for base station to be able to indicate other information, e.g. which resource the ACK/NACK feedback should be transmitted on.

Thus, according to an embodiment of system 600, TPC bit fields are transmitted in all DCI messages containing downlink assignments. However, only the TPC bits, or a subset of the TPC bits, transmitted on one CC, or a few CCs, contains the true TPC commands. The meaning of the other TPC bits depends on with which method the terminal is configured to feedback ACK/NACK for the associated DL transmission. As a result, in particular embodiments of system 600, the TPC bits that are not used to convey the true TPC command may be configured to be used for different purposes depending on the scenario, e.g. depending on which ACK/NACK feedback method the terminal, e.g. terminal 610, is configured to use. For example:

In case a terminal is configured for full ACK/NACK feedback, the unused TPC bits may be used to indicate the ACK/NACK resource, either PUSCH or PUCCH.

In case a terminal is configured for partial ACK/NACK feedback (ACK/NACK bundling) the unused TPC bits may be used as DAI.

The unused TPC bit(s)—if any—in the TPC bit field on the CC that carries the true TPC command may be used to indicate PUCCH or PUSCH resources, extension of the resource assignment, DAI bits, or to extend another parameter that does not exist, or is smaller in the DCI format used on that CC conveying the true TPC command.

Figure 7A:
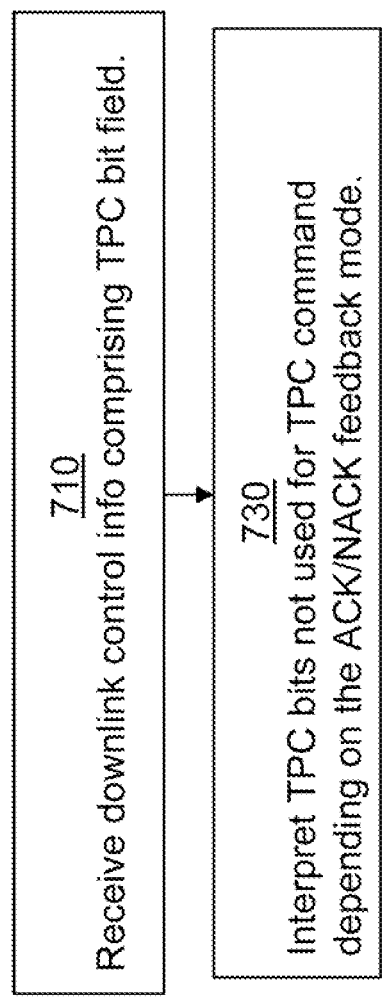
FIG. 7a is a flowchart illustrating a method in a mobile terminal according to some embodiments.

With reference to FIG. 6 and the flowchart of FIG. 7a, an example method in a mobile terminal 610 for processing downlink control information according to some embodiments will now be described. The mobile terminal 610 is capable of receiving multiple component carriers. According to the method, the mobile terminal 610 receives downlink control information on a component carrier in a step 710. The downlink control information comprises a bit field allocated for a transmit power control, TPC, command. In step 730, if the bit field comprises one or more bits that are not used for a TPC command, the mobile terminal 610 interprets the meaning of the bits not used for a TPC command depending on the ACK/NACK feedback mode the mobile terminal is configured with.

Figure 7B:
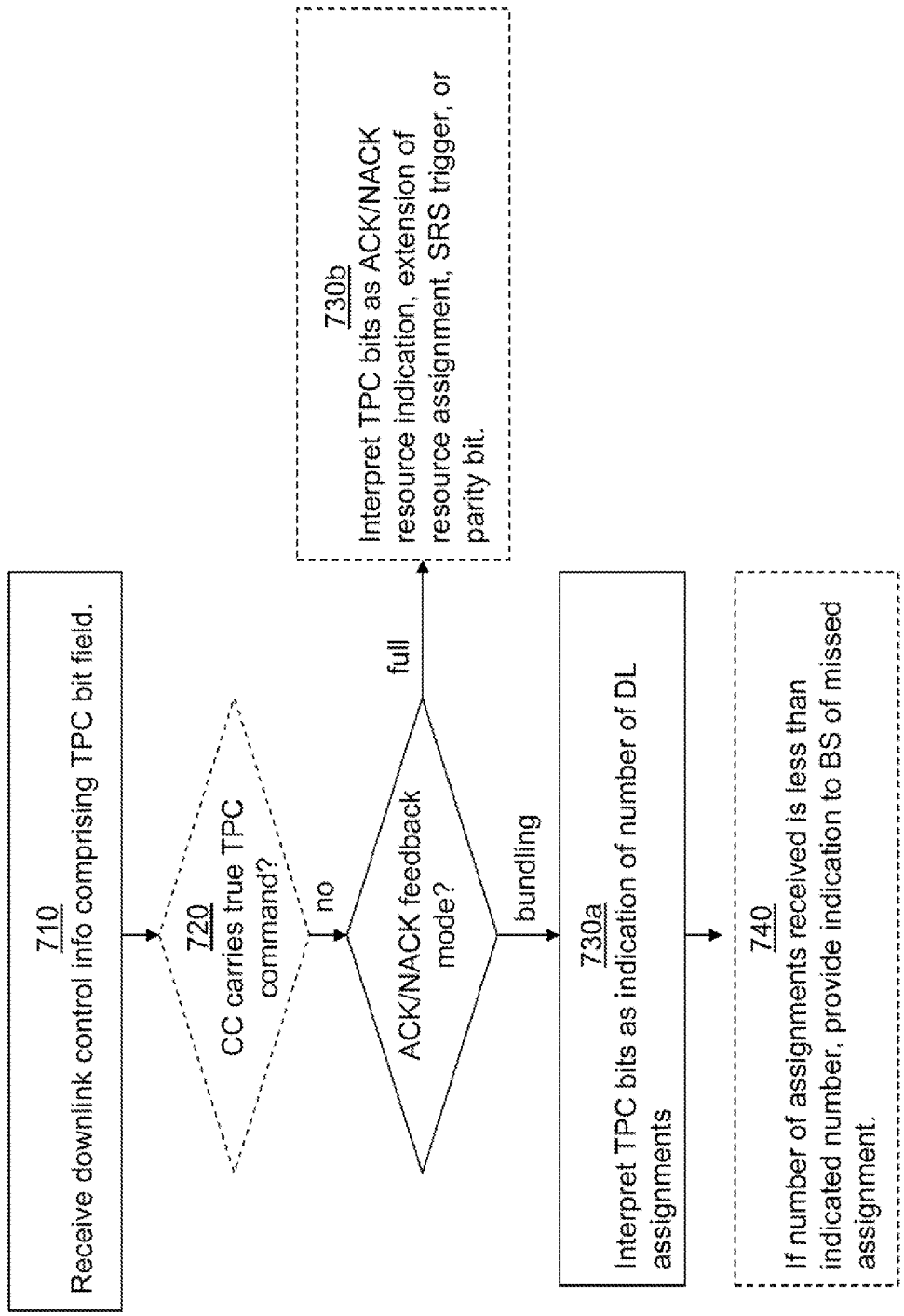
FIG. 7b is a flowchart illustrating a method in a mobile terminal according to some embodiments.

A more detailed example method in a mobile terminal 610 according to some embodiments will now be described, with reference to FIG. 6 and the flowchart of FIG. 7b. As in the previous example, the mobile terminal 610 is capable of receiving multiple component carriers. The mobile terminal 610 receives downlink control information on a component carrier in a step 710. The downlink control information comprises a bit field allocated for a transmit power control, TPC, command. If the bit field comprises one or more bits that are not used for a TPC command, the mobile terminal 610 interprets the meaning of the bits not used for a TPC command depending on whether the mobile terminal is configured to use bundled ACK/NACK feedback.

If the mobile terminal 610 is configured in an ACK/NACK bundling feedback mode, the mobile terminal 610 interprets the bits not used for a TPC command as comprising bundling information in step 730a. For example, the bits not used for a TPC command may be interpreted as an indication of how many downlink assignments the mobile terminal should have received or will receive. An advantage of this embodiment is that there may be no need to separately signal the downlink assignment indication, DAI.

In an optional step 740, if the number of downlink assignments received by the mobile terminal is less than the indicated number of downlink assignments, the mobile terminal provides an indication to a base station 620 serving the mobile terminal 610 that a downlink assignment has been missed. The indication may be provided by transmitting a NACK, or by using a specified resource.

If the mobile terminal 610 is instead configured in a full ACK/NACK feedback mode, the mobile terminal 610 interprets the bits not used for a TPC command in a different way in step 730b. The bits may be interpreted as comprising one or more of: an indication of an ACK/NACK resource, an extension of a resource assignment comprised in the downlink control information, a trigger to transmit aperiodic sounding reference signals, or a parity bit. As a particular example, the bits may be interpreted as comprising a PUCCH resource index, and the mobile terminal 610 may then transmit ACK/NACK feedback on the indicated PUCCH resource. It should be noted that step 730b is optional; thus, in one variant the bits are only interpreted as conveying other information if the mobile terminal 610 is configured in ACK/NACK bundling feedback mode.

There are several different ways in which the mobile terminal 610 may determine if the bit field comprises one or more bits that are not used for a TPC command.

In one variant, the mobile terminal 610 determines in step 720 if the component carrier carries the true TPC command, e.g. if the CC is configured to carry a TPC command. If the component carrier does not carry a TPC command, the mobile terminal 610 concludes all bits in the TPC field should be interpreted as conveying other information. The determination of whether the component carrier carries a true TPC command may be based on a rule. An example rule that may be applied is that the component carrier that carries a TPC command for the mobile terminal is the primary component carrier, PCC. Alternatively, the rule may relate to the component carrier index. For example, the mobile terminal 610 may determine that the component carrier that carries a TPC command for the mobile terminal is the component carrier with the lowest component carrier index. As yet another example, the rule may relate to the component carrier bandwidth, e.g., the component carrier that carries a TPC command for the mobile terminal is the component carrier with the narrowest bandwidth.

Alternatively, the mobile terminal 610 may determine that the TPC bit field carries a true TPC command, but that the TPC command does not occupy all the bits. For example, the TPC bit field may be defined as two bits, but only one bit is necessary to convey the TPC command. Such a situation may arise e.g. because of changes in the standard—i.e. an old TPC bit field may be 2 bits, whereas a new TPC command is defined as 1 bit. Thus, one or more bits may be interpreted as carrying other information, as already described in steps 730a and 730b above.

In yet another alternative, the information of which CC carries the true TPC command may be configured, e.g. by RRC signalling, in the mobile terminal 610; thus, determining whether a CC carries a TPC command may involve looking up preconfigured information in the mobile terminal 610, indicating which CC is configured to carry the TPC command.

The downlink control information may comprise a resource assignment, e.g. a downlink assignment, but other types of DCI messages comprising a TPC bit field may also be used. Furthermore, the downlink control information may be received on a physical downlink control channel (PDCCH) associated with the component carrier, but it should be understood that the information may also be received on another type of channel in particular embodiments of system 600.

An example method in a base station 620 for transmitting downlink control information to a mobile terminal 610 on a component carrier will now be described. The downlink control information comprises a bit field allocated for a transmit power control, TPC, command. The base station 620 is capable of transmitting on multiple component carriers.

According to the method, if the bit field comprises one or more bits that will not be used for transmitting a TPC command to the mobile terminal, the base station 620 uses at least one of the bits to transmit information other than TPC commands. The type of information transmitted depends on the ACK/NACK feedback mode the mobile terminal is configured with.

Figure 8:
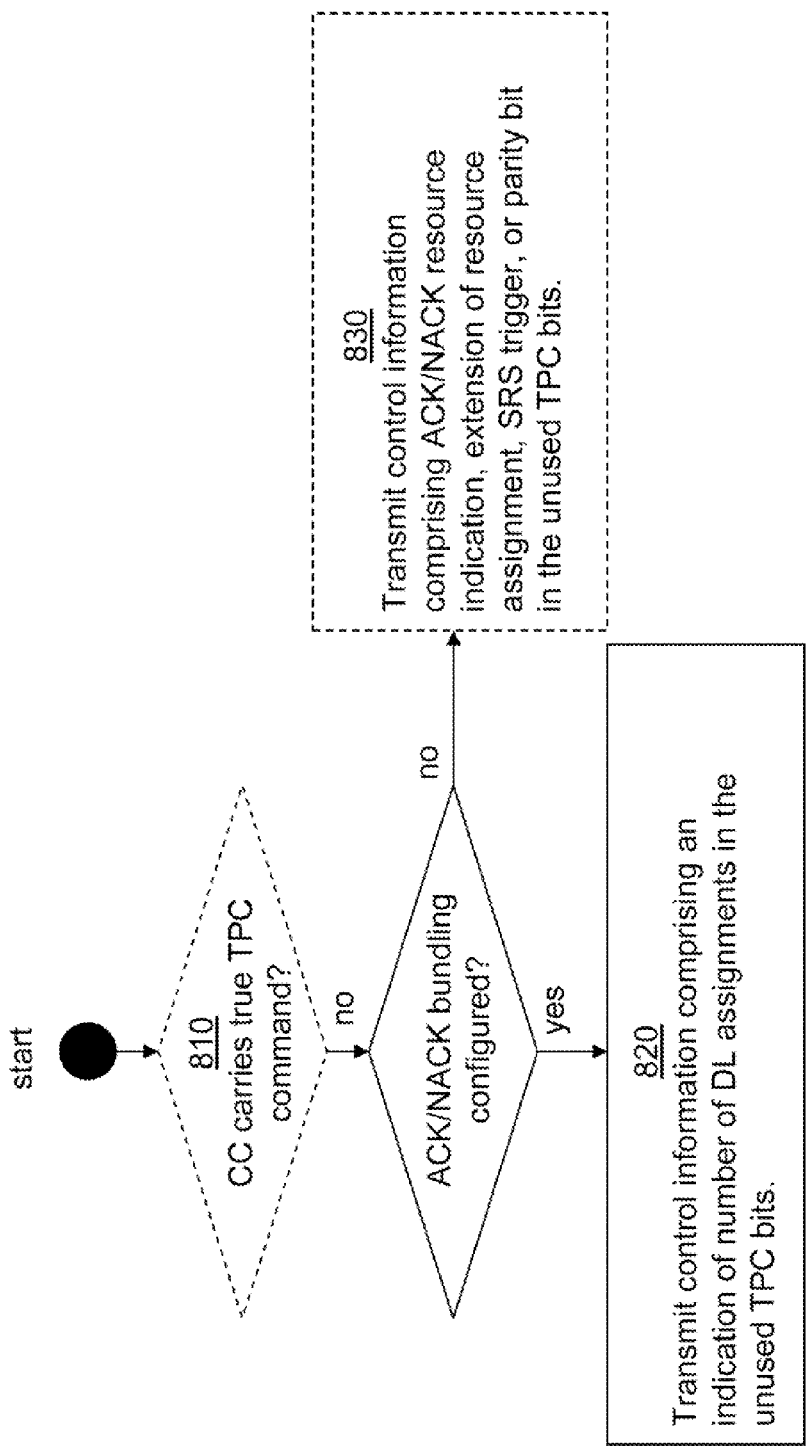
FIG. 8 is a flowchart illustrating a method in a base station according to some embodiments.

Referring to FIG. 6 and the flowchart of FIG. 8, we will now turn to a more detailed example method in a base station 620 for transmitting downlink control information to a mobile terminal 610 on a component carrier. As above, the downlink control information comprises a bit field allocated for a transmit power control, TPC, command, and the base station 620 is capable of transmitting on multiple component carriers. In particular embodiments, base station 620 repeats the process shown in FIG. 8 for each CC used to transmit downlink control information to mobile terminal 610.

In step 810, the base station 620 determines, based on a rule, if the component carrier carries a TPC command for the mobile terminal. Examples of rules have already been described in connection with FIG. 7b, i.e. the rule may be related to component carrier index, bandwidth, or the rule may be that the primary component carrier carries the TPC command. If it is determined that the component carrier does not carry a TPC command, then the base station 620 may use all the bits of the TPC field in the downlink control information transmitted on that CC to transmit other information, as will be described below.

Alternatively, if the component carrier is carries a TPC command, the base station 620 may still determine that the TPC command will not fill up the entire bit field, and thus there may be one or more bits that may be used for transmitting other information. Still further, the information about which component carrier carries the TPC command may be preconfigured in the base station 620. Thus, in particular embodiments base station 620 may determine whether the relevant CC is used to transmit the TPC command by accessing or receiving information indicating the relevant CC.

If the mobile terminal is configured in an ACK/NACK bundling feedback mode, the base station 620 transmits bundling information in at least one of the bits not used for a TPC command, in step 820. The bundling information may comprise an indication of how many downlink assignments the mobile terminal should have received or will receive.

If the mobile terminal is configured in a full ACK/NACK feedback mode, the base station 820 may, in step 830, transmit one or more of the following information in the bits not used for a TPC command: an indication of an ACK/NACK resource, an extension of a resource assignment comprised in the downlink control information, a trigger to transmit aperiodic sounding reference signals, or a parity bit. As a particular example, the base station 620 may transmit a PUCCH resource index, and then receive ACK/NACK feedback on the indicated PUCCH resource.

The downlink control information may comprise a resource assignment, e.g. a downlink assignment, but other types of DCI messages comprising a TPC bit field may also be used. Furthermore, the downlink control information may be transmitted on a physical downlink control channel (PDCCH) associated with the component carrier, but it should be understood that the information may also be transmitted on another type of channel within the scope of the invention.

An example mobile terminal for processing downlink control information will now be described with reference to FIG. 9. The mobile terminal 900 is configured to receive multiple component carriers. The mobile terminal 900 comprises one or more transceiver circuits 910, and one or more communication and control circuits 920. The communication and control circuits 920 are configured to perform the example methods describe above in connection with FIGS. 7a and 7b. More specifically, the communication and control circuits 920 are configured to receive downlink control information on a component carrier, where the downlink control information comprises a bit field allocated for a transmit power control, TPC, command. The communication and control circuits 920 are further configured to, if the bit field comprises one or more bits that are not used for a TPC command, interpret the meaning of the bits not used for a TPC command depending on the ACK/NACK feedback mode the mobile terminal is configured with. The mobile terminal 900 may be an LTE User Equipment, UE.

An example base station for transmitting downlink control information to a mobile terminal 900 on a component carrier will now be described with reference to FIG. 10. The base station 1000 is configured to transmit on multiple component carriers, and comprises one or more transceiver circuits 1010 and one or more communication and control circuits 1020. The downlink control information comprises a bit field allocated for a transmit power control, TPC, command. The communication and control circuits (1020) are configured to, if the bit field comprises one or more bits that will not be used for transmitting a TPC command to the mobile terminal 900, use at least one of the bits to transmit information other than TPC commands. The type of information transmitted depends on the ACK/NACK feedback mode the mobile terminal 900 is configured with. The base station 1000 may be an LTE eNodeB.

Figure 10:
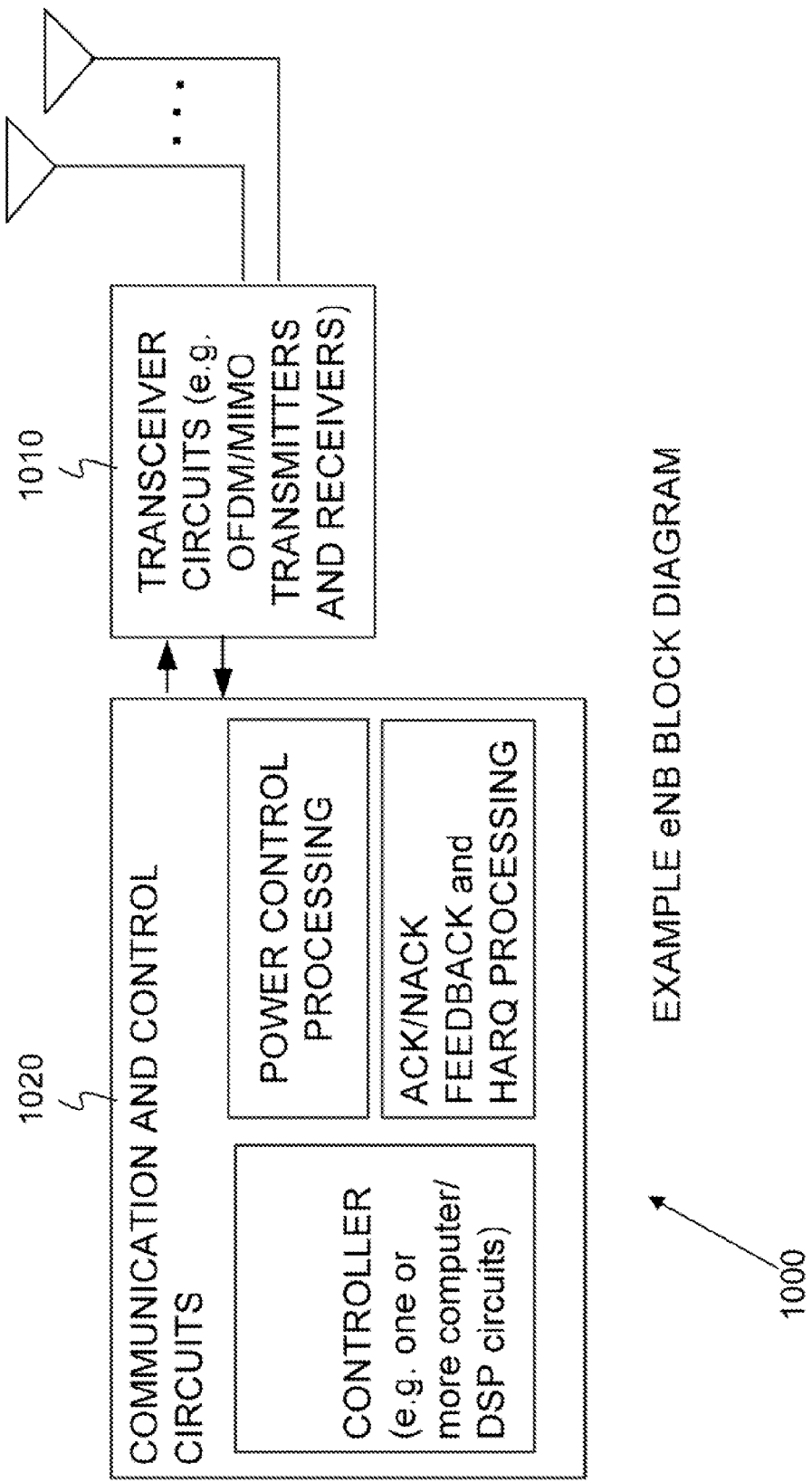
FIG. 10 is a diagram illustrating an example UE according to some embodiments.

Those of ordinary skill in the art will recognize that the example eNodeB in FIG. 10 is an illustration of one type of base station contemplated herein, which is configured in one or more embodiments to carry out certain network-side aspects of the present invention. The eNodeB is, in one or more embodiments, configured to implement the network-side of the present invention based on its inclusion of correspondingly configured processing circuitry. That circuitry may be programmable or dedicated, or may be a combination of fixed and programmable circuits. In at least one such embodiment, the eNodeB comprises one or more computer-based circuits (e.g., microprocessor and/or DSP base circuits) and the eNodeB includes non-volatile memory or another computer-readable medium that stores computer program instructions, the execution of which configures the eNodeB according to the various teachings presented herein. For example, the illustrated controller and/or power control processing circuitry of the eNodeB is configured to manage/set the meanings and corresponding information conveyed using TPC bits that are not used for carrying TPC information, in the multi-CC scenarios described herein.

Figure 9:
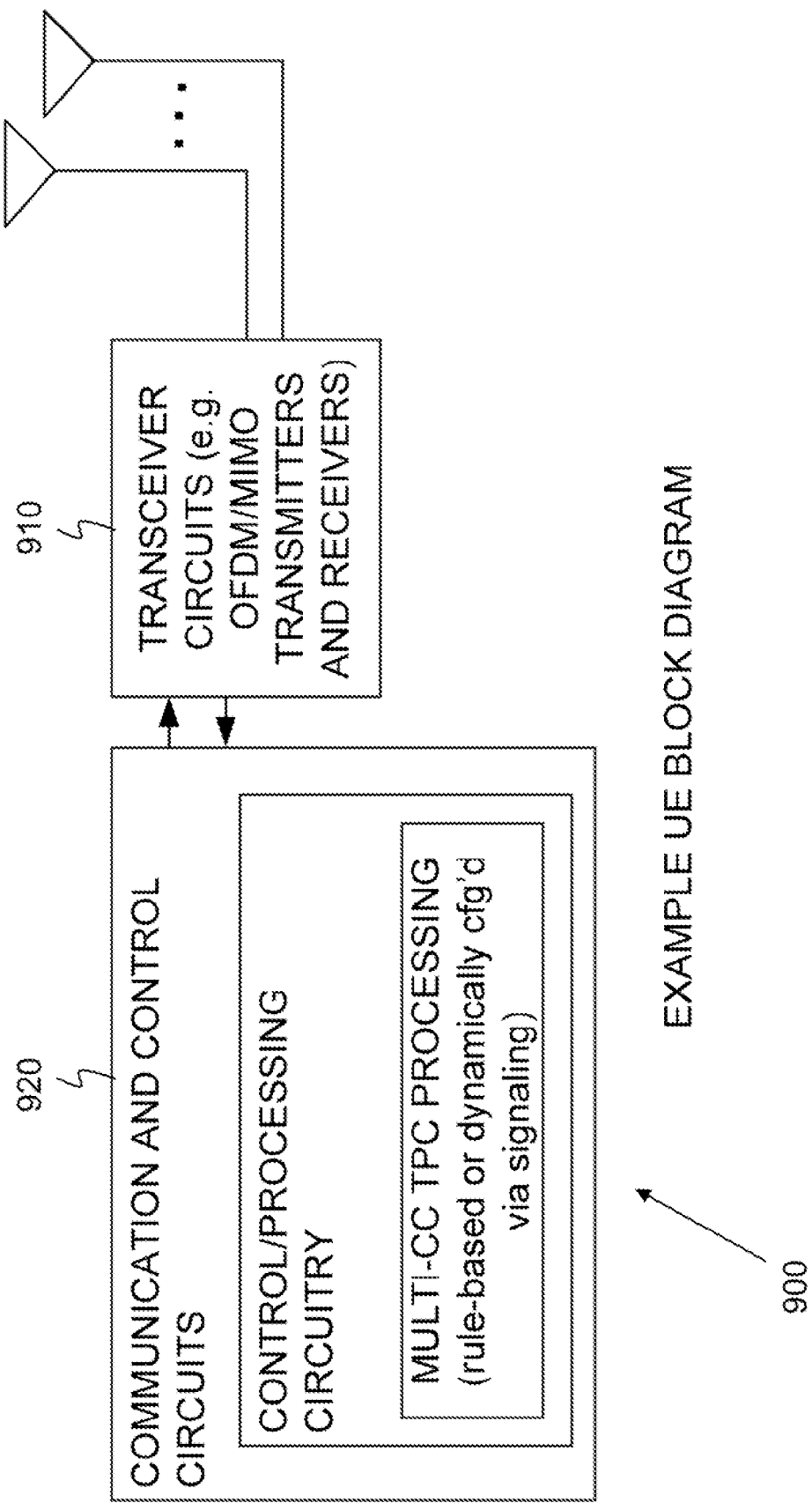
FIG. 9 is a diagram illustrating an example eNB according to some embodiments.

Similarly, those of ordinary skill in the art will recognize that the example UE in FIG. 9 is an illustration of one type of radio apparatus contemplated herein, which is configured in one or more embodiments to carry out certain UE-side aspects of the present invention. The UE is, in one or more embodiments, configured to implement the UE network-side of the present invention based on its inclusion of correspondingly configured processing circuitry. That circuitry may be programmable or dedicated, or may be a combination of fixed and programmable circuits. In at least one such embodiment, the UE comprises one or more computer-based circuits (e.g., microprocessor and/or DSP base circuits) and the UE includes non-volatile memory or another computer-readable medium that stores computer program instructions, the execution of which configures the UE according to the various teachings presented herein. For example, the various processing circuitry of the UE is configured to receive/interpret the meanings and corresponding information conveyed in the TPC bits that are not used for carrying TPC information, in the multi-CC scenarios described herein.

It should be noted that although terminology from 3GPP LTE has been used in this disclosure to exemplify the invention, this should not be seen as limiting the scope of the invention to only the aforementioned system. Any wireless system using carrier aggregation and different ACK/NACK feedback modes may also benefit from exploiting the ideas covered within this disclosure.

When using the word "comprise" or "comprising" it shall be interpreted as non-limiting, i.e. meaning "consist at least of".

The present invention is not limited to the above-describe preferred embodiments. Various alternatives, modifications and equivalents may be used. Therefore, the above embodiments should not be taken as limiting the scope of the invention, which is defined by the appending claims. In particular, it should be noted that the concepts presented herein also apply if cross-carrier scheduling is used, i.e. when a downlink assignment transmitted on one component carrier may apply to a different component carrier. In this case, the carrier indicator field (CIF) in the DCI message which identifies the CC the downlink assignment is for may be used to determine whether a particular DCI message carries a true TPC command, based on similar rules as described above.

ABBREVIATIONS

ACK Acknowledgement
ARQ Automatic Repeat Request
CC Component Carrier
DCI Downlink Control Information
NACK Non Acknowledgement
OFDM Orthogonal Frequency Division Multiple Access
PDCCH Physical Downlink Control CHannel
PUCCH Physical Uplink Control Channel
RRC Radio Resource Control
TPC Transmit Power Control

The invention claimed is:

1. A method in a mobile terminal for processing downlink control information, wherein the mobile terminal is capable of receiving multiple component carriers, the method comprising:
   receiving downlink control information on a component carrier, the downlink control information comprising a bit field allocated for a transmit power control command for the mobile terminal;
   determining, based on a rule relating to a component carrier bandwidth, whether the component carrier with the narrowest bandwidth carries the transmit power control command;
   when the component carrier with the narrowest bandwidth does not carry the transmit power control command, determining that none of the bits in the bit field are used for the transmit power control command;
   when the component carrier with the narrowest bandwidth carries the transmit power control command, determining whether one or more bits in the bit field are not used for the transmit power control command;
   when the bit field comprises one or more bits that are not used for the transmit power control command, interpreting the meaning of the bits not used for the transmit power control command in different ways, depending on an ACK/NACK feedback mode with which the mobile terminal is configured, wherein interpreting includes:
      when the mobile terminal is configured in a full ACK/NACK feedback mode, interpreting the bits not used for the transmit power control command as comprising one or more of a trigger to transmit aperiodic sounding reference signals, and a parity bit; and
      when the mobile terminal is configured in an ACK/NACK bundling feedback mode, interpreting the bits not used for the transmit power control command as comprising an indication of a number of downlink assignments the mobile terminal should have received or will receive, thereby eliminating a requirement to separately signal a Downlink Assignment Indication (DAI) to the mobile terminal.

2. The method of claim 1, further comprising:
   when the number of downlink assignments received by the mobile terminal is less than the indicated number of downlink assignments, providing an indication to a base station serving the mobile terminal that a downlink assignment has been missed.

3. The method of claim 2, wherein the indication is provided by transmitting a NACK, or by using a specified resource.

4. The method of claim 1, further comprising:
   when the mobile terminal is configured in the full ACK/NACK feedback mode, further interpreting the bits not used for the transmit power control command as comprising one or more of:
   an indication of an ACK/NACK resource, and
   an extension of a resource assignment comprised in the downlink control information.

5. The method of claim 4, further comprising:
   interpreting the bits not used for a transmit power control command as comprising an index for a Physical Uplink Control Channel (PUCCH) resource.

6. The method of claim 5, further comprising:
   transmitting ACK/NACK feedback on the indicated PUCCH resource.

7. The method of claim 1, wherein the downlink control information comprises a resource assignment, and wherein the downlink control information is received on a physical downlink control channel associated with the component carrier.

8. A mobile terminal for processing downlink control information, wherein the mobile terminal is configured to receive multiple component carriers, the mobile terminal comprising one or more transceiver circuits, and one or more communication and control circuits, the communication and control circuits being configured to:

receive downlink control information on a component carrier, the downlink control information comprising a bit field allocated for a transmit power control command for the mobile terminal;

determine, based on a rule relating to a component carrier bandwidth, whether the component carrier with the narrowest bandwidth carries the transmit power control command;

when the component carrier with the narrowest bandwidth does not carry the transmit power control command, determine that none of the bits in the bit field are used for the transmit power control command;

when the component carrier with the narrowest bandwidth carries the transmit power control command, determine whether one or more bits in the bit field are not used for the transmit power control command;

when the bit field comprises one or more bits that are not used for the transmit power control command, interpret the meaning of the bits not used for the transmit power control command in different ways, depending on an ACK/NACK feedback mode with which the mobile terminal is configured, wherein:

when the mobile terminal is configured in a full ACK/NACK feedback mode, the communication and control circuits are configured to interpret the bits not used for the transmit power control command as comprising one or more of a trigger to transmit aperiodic sounding reference signals, and a parity bit; and when the mobile terminal is configured in an ACK/NACK bundling feedback mode, the communication and control circuits are configured to interpret the bits not used for the transmit power control command as comprising an indication of a number of downlink assignments the mobile terminal should have received or will receive, thereby eliminating a requirement to separately signal a Downlink Assignment Indication (DAI) to the mobile terminal.

* * * * *

UNITED STATES PATENT AND TRADEMARK OFFICE
CERTIFICATE OF CORRECTION

PATENT NO.        : 8,867,464 B2
APPLICATION NO.   : 13/378905
DATED             : October 21, 2014
INVENTOR(S)       : Larsson et al.

It is certified that error appears in the above-identified patent and that said Letters Patent is hereby corrected as shown below:

In the Specification

In Column 5, Line 40, delete "and*" and insert -- and --, therefor.

Signed and Sealed this
Twelfth Day of May, 2015

Michelle K. Lee
*Director of the United States Patent and Trademark Office*